US012437614B2

(12) United States Patent
Charest et al.

(10) Patent No.: US 12,437,614 B2
(45) Date of Patent: Oct. 7, 2025

(54) LOTTERY GAMING SYSTEMS, METHODS OF OPERATING LOTTERY GAMING SYSTEMS, AND LOTTERY TICKETS

(71) Applicant: IGT Global Solutions Corporation, Providence, RI (US)

(72) Inventors: Joseph Charest, Attleboro, MA (US); Sarah Walker, Warwick, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 198 days.

(21) Appl. No.: 18/453,516

(22) Filed: Aug. 22, 2023

(65) Prior Publication Data

US 2025/0069482 A1 Feb. 27, 2025

(51) Int. Cl.
*G07F 17/32* (2006.01)

(52) U.S. Cl.
CPC ........ *G07F 17/329* (2013.01); *G07F 17/3244* (2013.01); *G07F 17/3262* (2013.01); *G07F 17/3267* (2013.01)

(58) Field of Classification Search
CPC ............... G07F 17/329; G07F 17/3244; G07F 17/3262; G07F 17/3267
USPC ...................................................... 463/17, 16
See application file for complete search history.

(56) References Cited

U.S. PATENT DOCUMENTS 6,969,318 B1 11/2005 Packes et al.
7,416,484 B1 * 8/2008 Nelson ................ G07F 17/3244 463/16
7,686,687 B2 * 3/2010 Cannon ................... G07F 17/32 463/25
7,914,371 B2 3/2011 Obrien
8,070,590 B2 * 12/2011 Cannon ................... G07F 17/34 463/20
8,221,210 B2 7/2012 Jubinville
8,328,632 B2 * 12/2012 Cannon ................... G07F 17/42 463/20
8,523,655 B2 9/2013 Lankots
8,662,985 B2 3/2014 Johnson
8,696,438 B2 4/2014 Englman et al.
9,142,090 B1 9/2015 White
2003/0157979 A1 * 8/2003 Cannon ................... G07F 17/42 463/16
2008/0234029 A1 * 9/2008 Cannon ................... G07F 17/42 463/17
2009/0042634 A1 * 2/2009 Cannon ............... G07F 17/3248 463/17
2012/0077560 A1 * 3/2012 Cannon ................... G07F 17/32 463/17

* cited by examiner

*Primary Examiner* — Pierre E Elisca
(74) *Attorney, Agent, or Firm* — Neal, Gerber & Eisenberg LLP

(57) ABSTRACT

A lottery gaming system and method of operation thereof that provide a play of a draw lottery game and based on an amount of the award from the play of the draw lottery game an associated play of a secondary game. Based on the amount of the award, the play of the secondary game can be automatic, or optional, or not provided at all.

20 Claims, 5 Drawing Sheets

LOTTERY GAMING SYSTEMS, METHODS OF OPERATING LOTTERY GAMING SYSTEMS, AND LOTTERY TICKETS

BACKGROUND

The present disclosure relates to lottery gaming systems, methods of operating lottery gaming systems, and lottery tickets for plays of lottery games.

Lottery gaming systems may enable a player to select one or more numbers for a lottery ticket, randomly select winning drawn lottery numbers, and if the winning drawn lottery numbers match the player-selected numbers, provide the player an award associated with the player-selected numbers.

BRIEF SUMMARY

In various embodiments, the present disclosure relates to a gaming system and a method of operating a lottery gaming system comprising a processor and a memory device that stores a plurality of instructions executable by the processor, wherein the method of operating the gaming system includes: determining, via the processor, a player symbol set for a play of a draw lottery game; determining, via the processor, a player selected automatic award range for an automatic play of a secondary game; generating, via the processor, a lottery ticket comprising the player symbol set and the player selected automatic award range; storing data associated with the lottery ticket; and causing, via the processor, the lottery ticket to be provided to a player, the lottery ticket comprising a player symbol set portion comprising an indication of the player symbol set for the play of the draw lottery game and a player selected automatic award range portion comprising an indication of the player selected automatic award range for the automatic play of the secondary game. The method of operating the gaming system further includes: for the play of the draw lottery game, determining a quantity of drawn symbols, the quantity of drawn symbols being at least one; determining an award for the play of the draw lottery game based on the player symbol set and the drawn symbols; responsive to the award being within the player selected automatic award range, automatically using the award as a wager for the automatic play of the secondary game; and responsive to the award being greater than the player selected automatic award range, causing a display, by a display device, of an indication of the award and not providing the automatic play of the secondary game.

In various other embodiments, the present disclosure relates to a gaming system and a method of operating a lottery gaming system comprising a processor and a memory device that stores a plurality of instructions executable by the processor, wherein the method of operating the gaming system includes: determining, via the processor, a player symbol set for a play of a draw lottery game; determining, via the processor, a player selected automatic award range for an automatic play of a secondary game; generating, via the processor, a lottery ticket comprising the player symbol set and the player selected automatic award range; storing data associated with the lottery ticket; and causing, via the processor, the lottery ticket to be provided to a player, the lottery ticket comprising a player symbol set portion comprising an indication of the player symbol set for the play of the draw lottery game and a player selected automatic award range portion comprising an indication of the player selected automatic award range for the automatic play of the secondary game. The method of operating the gaming system further includes: for the play of the draw lottery game, determining a quantity of drawn symbols, the quantity of drawn symbols being at least one; determining an award for the play of the draw lottery game based on the player symbol set and the drawn symbols; responsive to the award being within the player selected automatic award range, automatically using the award as a wager for the automatic play of the secondary game; and responsive to the award being greater than the player selected automatic award range: causing a display, by a display device, of an option for a player decision to use the award as a wager for a non-automatic play of the secondary game, responsive to receipt of a decision to use the award as the wager for the non-automatic play of the secondary game, providing the non-automatic play of the secondary game, and responsive to receipt of a decision to not use the award as the wager for the non-automatic play of the secondary game, not providing the non-automatic play of the secondary game.

In various embodiments, the present disclosure relates to a gaming system and a method of operating a lottery gaming system comprising a processor and a memory device that stores a plurality of instructions executable by the processor, wherein the method of operating the gaming system includes: determining, via the processor, a player symbol set for a play of a draw lottery game; determining, via the processor, a player selected automatic award range for an automatic play of a secondary game; generating, via the processor, a lottery ticket comprising the player symbol set and the player selected automatic award range; storing data associated with the lottery ticket; and causing, via the processor, the lottery ticket to be provided to a player, the lottery ticket comprising a player symbol set portion comprising an indication of the player symbol set for the play of the draw lottery game and a player selected automatic award range portion comprising an indication of the player selected automatic award range for the automatic play of the secondary game. The method of operating the gaming system further includes: for the play of the draw lottery game, determining a quantity of drawn symbols, the quantity of drawn symbols being at least one; determining an award for the play of the draw lottery game based on the player symbol set and the drawn symbols; responsive to the award being within the player selected automatic award range, automatically using the award as a wager for the automatic play of the secondary game; responsive to the award being higher than the player selected automatic award range and the award being equal to or greater than a secondary wager limit, not providing any play of the secondary game, and causing the lottery ticket to be redeemable for the award; and responsive to the award being greater than the player selected automatic award range and less than the secondary wager limit: causing a display, by a display device, of an option for a player decision to use the award as a wager for a non-automatic play of the secondary game, responsive to receipt of a decision to use the award as the wager for the non-automatic play of the secondary game, providing the non-automatic play of the secondary game, and responsive to receipt of a decision to not use the award as the wager for the non-automatic play of the secondary game, not providing any play of the secondary game.

Additional features are described in, and will be apparent from, the following Detailed Description and the figures.

DETAILED DESCRIPTION

Figure 1:
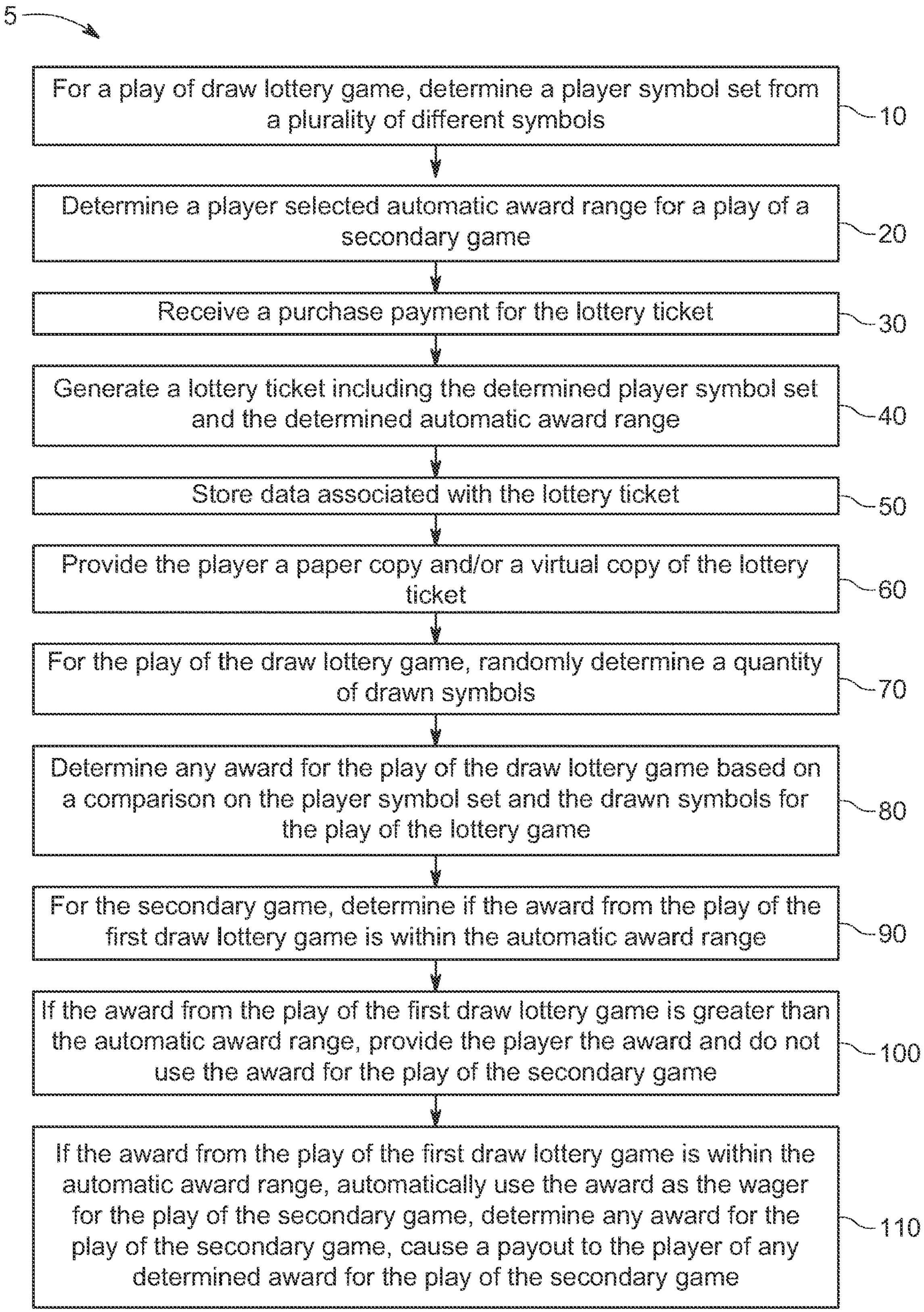
FIG. 1 is a flow chart of a method for operating a lottery gaming system in accordance with one example embodiment of the present disclosure.

In various embodiments, the present disclosure relates to lottery gaming systems and methods of operating lottery gaming systems that provide a play of a draw lottery game, and an associated play of a secondary game based on an amount of the award from the play of the draw lottery game. Based on the amount of the award from the play of the draw lottery game, the play of the secondary game can be automatic, or optional for the player, or not provided at all in various embodiments.

In various embodiments, for the play of the draw lottery game, the lottery gaming system and method provide a selection of a player symbol set including one or more player symbols (such as a plurality of player numbers) that are for the play of the draw lottery game. The play of the draw lottery game includes a determination of an award based on a comparison of the player symbol set to one or more drawn symbols for the play of the draw lottery game.

In various embodiments, for the play of the secondary game, the lottery gaming system and method determine, based on the amount of the award from the play of the draw lottery game, whether to automatically use the award from the play of the draw lottery game as a wager for the play of the secondary game. In various embodiments, if the award from the play of the draw lottery game is within an automatic award range (such as a predetermined automatic award range or a player selected automatic award range), the lottery gaming system automatically uses that award as a wager for the play of the secondary game. In various embodiments, if the award from the play of the draw lottery game is above the automatic award range, the lottery gaming system does not automatically use that award for the play of the secondary game, but rather provides the player the option to use that award as a wager for a non-automatic play of the secondary game. If the player does not exercise the option to use that award for the non-automatic play of the secondary game, the award is provided to the player. If the player exercises the option to use that award as the wager for the non-automatic play of the secondary game or if the award is within the automatic award range, the lottery system uses the award as a wager for the play of the secondary game, and determines any award for the play of the secondary game. In various embodiments, the award for play of the secondary game can be equal to, higher than, or lower than the award from the play of the draw lottery game. In various other embodiments, the award for the play of the secondary game can be higher than or lower than the award from the play of the draw lottery game. In various such embodiments, the award for the play of the secondary game can be double the award from the play of the draw lottery game or zero.

Thus, in various embodiments, the lottery gaming system and method enable a player to purchase a lottery ticket including a play of a draw lottery game and a potential play of the secondary lottery game—that in certain instances (based on the amount of the award for the draw lottery game) automatically uses the award from the play of the draw lottery game as a wager for the play of the secondary game, and in other instances (based on the amount of the award for the draw lottery game) provides the player the option to use the award from the play of the draw lottery game as a wager for the play of the secondary game. In various other embodiments, if the award for the play of the draw lottery game is above the automatic award range, the lottery system does not provide the player the option to use the award from the play of the draw lottery game as a wager for the play of the secondary game, but rather provides the award to the player.

Additionally, in various embodiments, the lottery gaming system and method enable a player to purchase a lottery ticket including a play of an instant ticket lottery game and a potential play of the secondary lottery game—that in certain instances (based on the amount of the award for the instant ticket lottery game) automatically uses the award from the play of the instant ticket lottery game as a wager for the play of the secondary game, and in other instances (based on the amount of the award for the instant ticket lottery game) provides the player the option to use the award from the play of the instant ticket lottery game as a wager for the play of the secondary game. In various other embodiments, if the award for the play of the instant ticket lottery game is above the automatic award range, the lottery system does not provide the player the option to use the award from the play of the instant ticket lottery game as a wager for the play of the secondary game, but rather provides the award to the player.

In various other embodiments, if the award for the play of the lottery game is above the automatic award range and below a secondary wager limit, the lottery system provides the player the option to use the award from the play of the lottery game as a wager for the play of the secondary game, and if the award for the play of the lottery game is at or above the secondary wager limit, the lottery system does not provide the player the option to use the award from the play of the lottery game as a wager for the play of the secondary game, but rather provides the award to the player.

In various embodiments, if the award for the play of the lottery game is zero, the gaming system and method do not provide the play of the secondary game.

In various embodiments, the lottery gaming system and method enable a player to purchase a lottery ticket including a play of the lottery game without any potential play of the secondary game.

In various embodiments, the lottery gaming system and method enable a player to purchase a lottery ticket including a play of the lottery game only associated with a potential play of the secondary game.

In various embodiments, the secondary game includes a single automatic award range that determines whether the award from the play of the lottery game is automatically used as a wager for the play of the secondary game. In such embodiments, the player does not have a choice to select one of a plurality of different automatic award ranges.

In various other embodiments, the secondary game includes multiple different player selectable automatic award ranges, wherein the player selected automatic award range is used to determine whether the award from the play of the lottery game is automatically used as a wager for the play of the secondary game. In various such embodiments, the player selects the automatic award range from a plurality of different automatic award ranges.

In various embodiments, the lottery gaming system and method is configured to enable a player to set up their account (such as an online lottery ticket purchase account) with one or more rules regarding the secondary game and the automatic award range. In such existing lottery gaming systems, for any lottery ticket purchased, the lottery gaming system automatically deposits any winning amounts (below a certain level) in the player's deposit account. For awards above the certain level, the lottery system can require the player to collect the award in person. The lottery gaming system and method of the present disclosure enables that player to set up their account such that the lottery gaming system first evaluates each of their winning amounts from the lottery tickets purchased through the lottery gaming system for potential automatic play of the secondary game.

In various such embodiments, the lottery gaming system can enable the player to set up their online account in any of the following manners.

The first example manner is: (a) if the amount of the award for the play of the lottery game is within an automatic award range, the gaming system automatically uses the award from the play of the lottery game as a wager for the play of the secondary game; and (b) if the amount of the award for the play of the lottery game is greater than automatic award range, the gaming system does not automatically use the award from the play of the lottery game as a wager for the play of the secondary game, but rather deposits the award (below the certain level).

The second example manner is: (a) if the amount of the award for the play of the lottery game is within an automatic award range, the gaming system automatically uses the award from the play of the lottery game as a wager for the play of the secondary game; and (b) if the amount of the award for the play of the lottery game is greater than automatic award range, the gaming system does not automatically use the award from the play of the lottery game as a wager for the play of the secondary game, but rather notifies the player of the award and the player's option to use the award for the play of the secondary game. In such case, the lottery gaming system can require the player to make one or more inputs for the lottery gaming system to use the player award for the play of the secondary game.

The third example manner is: (a) if the amount of the award for the play of the lottery game is within an automatic award range, the gaming system automatically uses the award from the play of the lottery game as a wager for the play of the secondary game; (b) if the amount of the award for the play of the lottery game is greater than automatic award range and less than a secondary wager limit, the gaming system does not automatically use the award from the play of the lottery game as a wager for the play of the secondary game, but rather notifies the player of the award and the player's option to use the award for the play of the secondary game; and (c) if the amount of the award for the play of the lottery game is greater at least equal to the secondary wager limit, the gaming system does not automatically use the award from the play of the lottery game as a wager for the play of the secondary game, and does not provide the player the option to use the award for the play of the secondary game, but rather automatically but rather deposits the award (below the certain level) in the player's account. In such case, the lottery gaming system can require the player to make one or more inputs for the lottery gaming system to use the player award for the play of the secondary game when the amount of the award for the play of the lottery game is greater than automatic award range and less than a secondary wager limit.

In various embodiments, the lottery gaming system and method enable the player to set up their online account such that their selected rules for potential automatic plays of the secondary game apply to only certain plays of one or more lottery games or all plays of lottery games by the player using the online lottery system.

In various embodiments, the lottery gaming system and method enable the player to set up the amounts for the automatic award range and the secondary wager limit.

In various embodiments, the lottery gaming system and method enable the player to select the amounts for the automatic award range and the secondary wager limit from predefined amounts provided by and displayed by the lottery gaming system.

In various embodiments, the lottery gaming system and method provide pre-set amounts for the automatic award range and the secondary wager limit that are not selectable by the player, but rather that are the only choices allowed by the lottery gaming system if the player wants to participate in the automatic play of the secondary game.

It should be appreciated from the above that the present disclosure contemplates that the automatic secondary game play features can thus be employed in a retail lottery ticket environment or an online lottery ticket environment.

It should also be appreciated from the above that the present disclosure contemplates that the automatic secondary game play features can be provided for draw lottery game, instant ticket lottery games, or any other know or future developed lottery games.

In various embodiments, the odds of winning the secondary game are all static regardless of the amount of the award for the play of the lottery game that functions as the wager for the secondary game.

In various other embodiments, the odds of winning the secondary game can be different based on the amount of the award for the play of the lottery game that functions as the wager for the secondary game. For example, a higher award from the play of the lottery game can result in greater odds of winning the secondary game.

In various embodiments, the paytables for the play of the lottery game and the play of the secondary game are separate and independent paytables. These paytables can be separate and independent because when the play of the secondary game is provided (whether automatic or player requested), the award from the play of the lottery game is used as a wager for the play of the secondary game. Thus, the paytable for the play of the secondary game does not need to be dependent on or related to the wager on the play of the lottery game or the paytable thereof. In other embodiments, these paytables can be interrelated.

In various embodiments, the probability or odds of obtaining a higher award in the play of the secondary game is displayed in conjunction with the selection of the selectable automatic award range.

In various embodiments, the symbols for the play of the lottery game are numbers. In the example embodiments described herein, the symbols are numbers, but it should be appreciated that such example embodiments are not meant to limit the present disclosure.

The following example embodiments employ a draw lottery game as an example, but are not meant to limit the present disclosure.

FIG. 1 is a flowchart of an example method (indicated by numeral 5) of operating an example lottery gaming system of the present disclosure. In various embodiments, the method 5 is represented by a set of instructions stored in one or more memory devices and executed by one or more processors. Although the method 5 is described with reference to the flowchart shown in FIG. 1, other processes of performing the acts associated with this illustrated example method can be employed. For example, the order of certain of the illustrated blocks and/or diamonds may be changed, certain of the illustrated blocks and/or diamonds may be optional, or certain of the illustrated blocks and/or diamonds may not be employed.

In the example embodiment illustrated in FIG. 1, the method 5 includes the lottery gaming system: (1) for a play of a draw lottery game, determining a player symbol set from a plurality of different symbols, as indicated by block 10; (2) determining a player selected automatic award range for a play of a secondary game, as indicated by block 20; (3) receiving a purchase payment for the lottery ticket (that functions as a wager for the play of the draw lottery game), as indicated by block 30; (4) generating a lottery ticket including the determined player symbol set and the determined automatic award range, as indicated by block 40; (5) storing data associated with the lottery ticket, as indicated by block 50; and (6) providing the player a paper copy and/or a virtual copy of the lottery ticket, as indicated by block 60.

The method 5 further includes the lottery system: (7) for the play of the draw lottery game, randomly determining a quantity of drawn symbols, as indicated by block 70; and (8) determining any award for the play of the draw lottery game based on a comparison on the player symbol set and the drawn symbols for the play of the draw lottery game, as indicated by block 80.

The method 5 further includes the lottery system: (9) for the secondary game, determining if the award from the play of the first draw lottery game is within the automatic award range, as indicated by block 90; (10) if the award from the play of the first draw lottery game is greater than the automatic award range, providing the player the award and not using the award for the play of the secondary game, as indicated by block 100; and (11) if the award from the play of the first draw lottery game is within the automatic award range, automatically using the award as the wager for the play of the secondary game, determining any award for the play of the secondary game, and causing a payout to the player of any determined award for the play of the secondary game, as indicated by block 110.

As indicated above, in various other embodiments, if the award for the play of the lottery game is above the automatic award range, the lottery system provides the player the option to use the award from the play of the draw lottery game as a wager for the play of the secondary game instead of providing the award to the player.

As also indicated above, in various other embodiments, if the award for the play of the draw lottery game is above the automatic award range and below a secondary wager limit, the lottery system provides the player the option to use the award from the play of the draw lottery game as a wager for the play of the secondary game, and if the award for the play of the draw lottery game is at or above the secondary wager limit, the lottery system does not provide the player the option to use the award from the draw lottery game as a wager for the secondary game, but rather provides the award to the player.

In various embodiments, the symbols of the determined player symbol set for the play of the draw lottery game are selected by the player. In various embodiments, the symbols of the determined player symbol set for the play of the draw lottery game are randomly selected by the lottery system. In various embodiments, the symbols of the determined player symbol set for the play of the draw lottery game are randomly selected by the lottery system at the request of the player (such as via a quick pick).

In various embodiments, the secondary game is a double or nothing game where the award resulting from the play of the secondary game is either double the amount of the award from the play of the draw lottery game or is zero.

In various embodiments, the secondary game is a different secondary game where the award from the play of the secondary game is greater than or less than the award from the play of the draw lottery game.

In various embodiments, the secondary game is a different secondary game where the award from the play of the secondary game is greater than, equal to, or less than the award from the play of the draw lottery game.

In various embodiments, the lottery gaming system determines any award for the play of the draw lottery game if the player symbol set of the lottery ticket match each of the drawn numbers for the play of the draw lottery game. That is, the lottery gaming system provides an award to a player if the player numbers of the player symbol set match all of the drawn numbers for that play of the draw lottery game. In other example embodiments, less that all of the numbers need to be matched for the play of the draw lottery game to result in an award greater than zero.

It should be appreciated that the award(s) associated with the play of the draw game and the play of the secondary lottery game can be any suitable awards. These awards can be static, in static ranges, in changeable ranges, or otherwise changeable. In various embodiments, the changeable awards can be progressive awards, pari-mutuel awards, or other suitable changeable awards. In various embodiments, the awards can be static or changeable based on the wager level of the player, or otherwise.

1st Example Embodiment

In one example embodiment of the present disclosure, the first game is a draw lottery game, and the secondary game is a double or nothing game.

In this example embodiment, the lottery gaming system is configured to receive four player selections from the numbers 0 through 39 (inclusive of 0 and 39) for a play of the draw lottery game for the lottery ticket. The numbers can be any suitable numbers.

In this example embodiment, the lottery gaming system is configured to enable the player to use a paper or virtual playslip to select: (1) the play of the draw lottery game; (2) the numbers of the player symbol set for the play of the draw lottery game; (3) the player selected automatic award range for the secondary game; and (4) the wager level (e.g., a wager amount on the play of the draw lottery game), and thus to purchase the lottery ticket.

Figure 2:
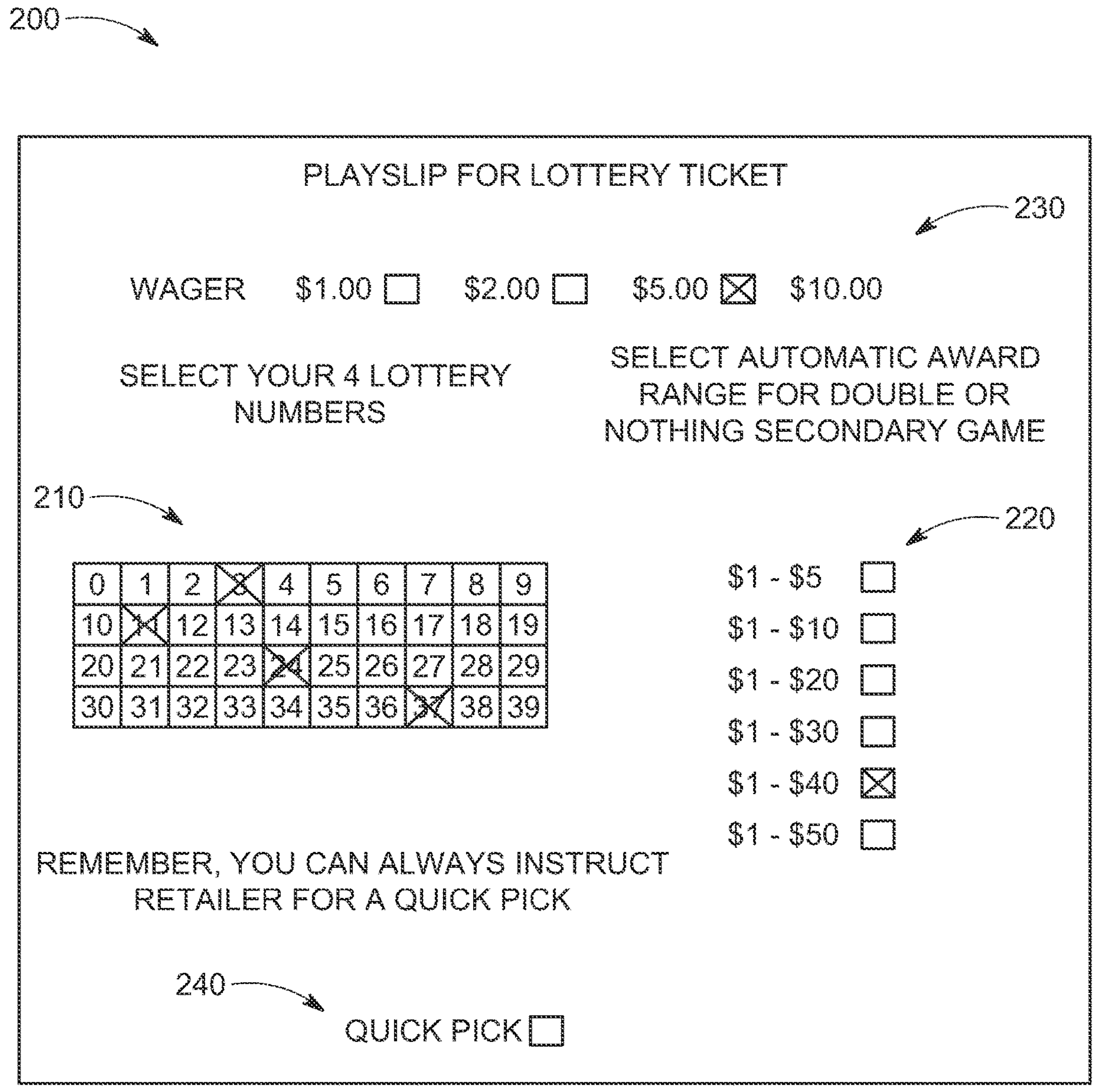
FIG. 2 is a lottery play slip in accordance with one example embodiment of the present disclosure.

In the example illustrated embodiment shown in FIG. 2, the lottery gaming system is configured to enable the player to use a single paper or virtual playslip to select the player symbol set, the player selected automatic award range for the secondary game, the wager, and to purchase the lottery ticket. FIG. 2 illustrates an example playslip 200. This playslip 200 includes: (1) a play symbol set selection portion 210; (2) a selectable player automatic award range selection portion 220; (3) a wager indication portion 230; and (4) a quick pick instruction portion 240. That is, instead of the player using the selection portion 210 for the selection of the player symbol set, the player may request the lottery system to randomly select the player symbol set. It should be appreciated that other embodiments of the playslip can include additional or alternative portions and player options and can be arranged in any suitable manner in accordance with the present disclosure.

In this example illustrated embodiment shown in FIG. 2, the player symbol set selection portion 210 of the playslip 200 includes a set of 40 different player-selectable numbers from which the player can select four numbers from the numbers 0 through 39 (inclusive of 0 and 39). In this example, each area includes a respective different number surrounded by a rectangular boarder. It should be appreciated that while the player symbol set selection portion 210 includes 40 different player-selectable numbers, any suitable arrangement of numbers (or symbols) can be employed depending on the draw lottery game.

As shown in FIG. 2, in this example illustrated embodiment, the player has selected the numbers (and particularly, the numbers "3," "11," "24," and "37,") on the playslip 200 for their lottery ticket. These player-selected numbers (that form the player symbol set of numbers) are marked with Xs over the respective numbers in this example. It should be appreciated that the player-selected numbers may be marked in any other suitable manner. The four numbers form the player symbol set for the play of the draw lottery game in this example.

In this example illustrated embodiment shown in FIG. 2, the player automatic award range selection portion 220 of the playslip 200 includes six different player selectable automatic award ranges (wherein the player can select any one of the different award ranges). It should be appreciated that while the automatic award range selection portion 220 includes 6 different player selectable automatic award ranges, any suitable automatic award ranges can be employed. The quantity of ranges and the scope of each range can vary in accordance with the present disclosure. As shown in FIG. 2, in this example illustrated embodiment, the player has selected the automatic award range of $1-$40 on this playslip 200 for play of the secondary game. This player selected automatic award range is indicated by an X indicator. It should be appreciated that the player-selected automatic award range may be marked or otherwise indicated in any other suitable manner. In this example embodiment, the top amount ($50) for the highest automatic award range ($1-$50) is less than the top award for the play of the draw lottery game such that the award for the draw lottery game can be higher than and outside of any of the automatic award ranges. It should be appreciated that in other example embodiment, the automatic award range selection portion 220 includes a single player selectable automatic award range, and simply enables the player to select or not select that single automatic award range. In such cases, (a) if the player does not select that single automatic award range, that the secondary game feature is not provided for that lottery ticket; and (b) if the player selects that single automatic award range, the secondary game feature is provided for that lottery ticket with that automatic award range.

In this example embodiment of FIG. 2, the wager indication portion 230 of the playslip 200 includes a wager entry portion that the player may utilize for selecting a wager on the play of the draw lottery game. For example, the player may indicate a wager level of $1, $2, $5, or $10, or other such suitable wager on the play of the draw lottery game. In other embodiments, the amount of the wager on the play of the draw lottery game is static (such as $1). As shown in FIG. 2, in this example illustrated embodiment, the player has selected the $5.00 wager for play of the draw lottery game.

In this example embodiment of FIG. 2, the quick pick instruction portion 240 of the playslip 200 includes a message "REMEMBER, YOU CAN ALWAYS INSTRUCT RETAILER FOR A QUICK PICK," that reminds the player they can have the lottery gaming system randomly select the numbers for the play of the draw lottery game. In this example embodiment, the player has selected numbers in the number selection portion 210 of the playslip 200. As such, the player selects their own numbers for the play of the draw lottery game.

After making all of the needed player selections on the playslip 200, the lottery gaming system enables the player to purchase a lottery ticket through the lottery gaming system. In various embodiments of the lottery gaming system, the playslip is paper and the player may purchase the lottery ticket via the paper playslip. In various other embodiments of the lottery gaming system, the playslip is virtual and the player may purchase the lottery ticket via the virtual playslip. In various other embodiments, the lottery gaming system is configured to accommodate both paper and virtual playslips.

In various embodiments of the lottery gaming system, the player may purchase the lottery ticket via any suitable manner such as, but not limited to, one of the following: (1) a dedicated lottery kiosk (e.g., a lottery kiosk) configured to communicate over a data network (such as the Internet) to a lottery server (such as a lottery server 606 described below in connection with FIG. 5); (2) a retailer-operated lottery terminal configured to communicate over a data network (such as the Internet) to a lottery server (such as a lottery server 606 described below in connection with FIG. 5); (3) a personal computer configured to communicate over a data network (such as the Internet) to a lottery server (such as a lottery server 606 described below in connection with FIG. 5); and/or (4) a personal mobile device (such as a cellular telephone, tablet, a smart phone, or PDA) configured to communicate over a data network (such as a wireless or cellular data network) to a lottery server (such as a lottery server 606 described below in connection with FIG. 5).

In one such example embodiment, the lottery gaming system enables a player to use a paper playslip to purchase a lottery ticket at a retail location having a lottery terminal configured to receive the playslip and print the lottery ticket at the time of purchase in a conventional manner. In such lottery gaming systems, the retail operator can receive the purchase price for the lottery ticket from the player in a conventional manner.

In another such example embodiment, the lottery gaming system enables a player to use a virtual playslip to purchase a lottery ticket through a retail lottery kiosk configured to display the playslip (as further described below), receive the player number selections using the displayed playslip (as further described below), receive the wager from the player, and print the lottery ticket at the time of purchase. This example lottery kiosk may include an integral printer device and/or be in communication with a printer device for providing a printed lottery ticket to the player.

In another such example embodiment, the lottery gaming system enables a player to use a virtual playslip to purchase a lottery ticket electronically using a personal mobile device such as the player's mobile telephone. In one such embodiment, the lottery gaming system receives from this device the player number selections and the wager from the player, and sends the player a virtual lottery ticket (which in certain instances can be printed by the player using a suitable personal printing device). Thus, it should be appreciated that in various example embodiments, the player may purchase a lottery ticket with a personal mobile device and, thus, may not be provided with a physical (i.e., paper) lottery ticket. Instead, an electronic (or virtual) version of the lottery ticket is provided to the player via, for example, an electronic mail to an email account associated with the player.

Figure 3:
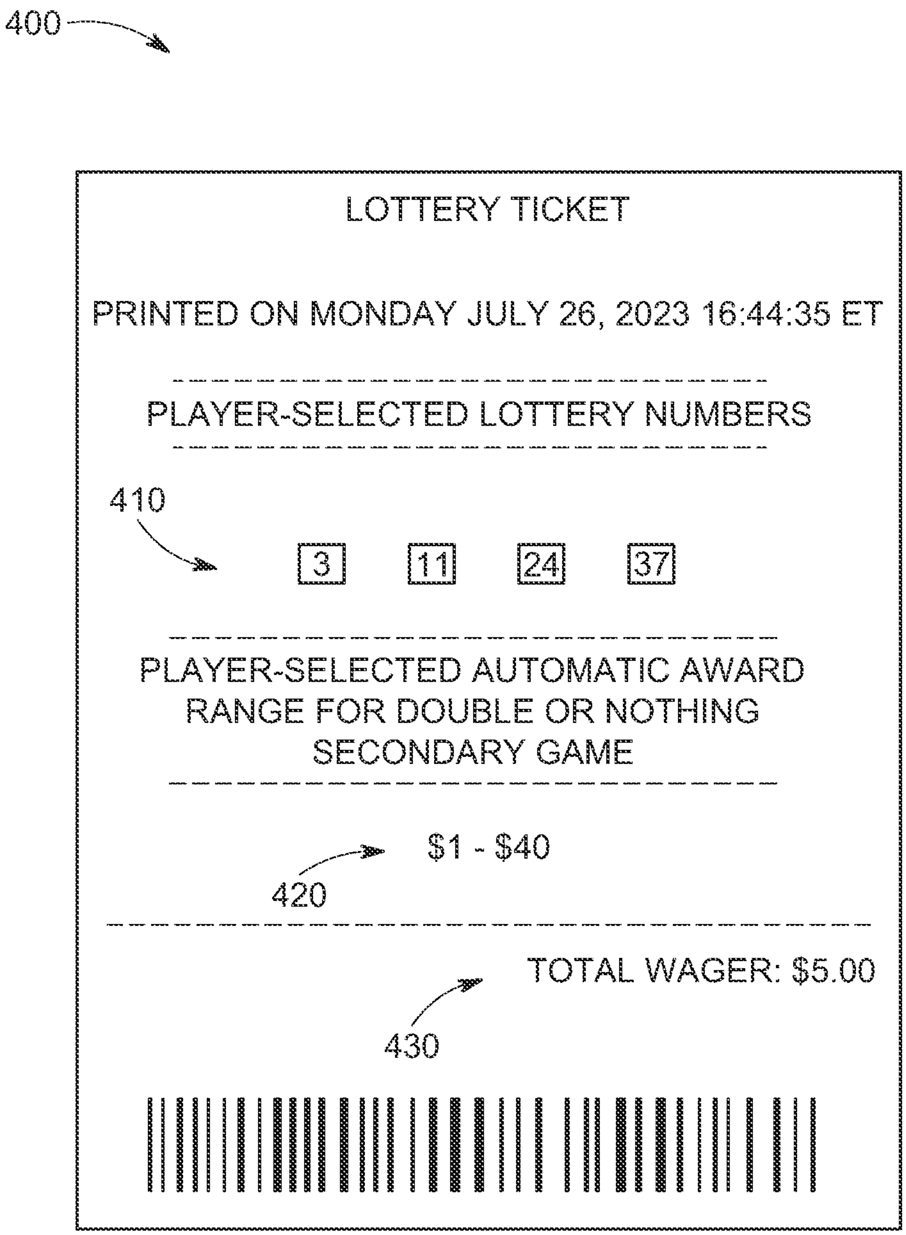
FIG. 3 is a lottery ticket in accordance with one example embodiment of the present disclosure.

FIG. 3 illustrates an example lottery ticket 400 that can be issued to a player based on the player symbol set for the play of the draw lottery game, the wager amount for the play of the draw lottery game, and the player selected automatic award range for the play of the secondary game. In this example embodiment, the lottery ticket 400 includes a selected player symbol set portion 410, a selected player automatic award range portion 420, a wager portion 430, and an indication of the play of the draw lottery game. It should be appreciated that in various embodiments, the lottery ticket may display or include additional or alternative information, such as a player identifier, a serial number, and/or any other relevant information. It should also be appreciated that the lottery ticket provided by the lottery gaming system of the present disclosure may be alternatively configured.

In this example illustrated embodiment, the selected player symbol set portion 410 of the lottery ticket 400 indicates the player symbol set in the player symbol set portion 210. In this example embodiment, the player symbol set includes the numbers 3, 11, 24, and 37.

In this example illustrated embodiment, the selected player automatic award range portion 420 of the lottery ticket 400 indicates the player selected automatic award range for the secondary lottery game. In this example embodiment, the player selected automatic award range is $1-$40. In the example, if the award for the play of the draw lottery game is over $40, the lottery system does not provide the play of the secondary game. Rather, when this lottery ticket 400 is redeemed, the lottery gaming system causes the award that is greater than $40 to be provided to the player that holds of the lottery ticket 400.

In this example embodiment, for each lottery ticket purchased, the lottery gaming system creates a data record corresponding to that lottery ticket. For example, when a lottery terminal is used to purchase a lottery ticket, the lottery gaming system creates a data record including suitable information such as but not limited to: (1) a timestamp (date and/or time) associated with when the lottery ticket was purchased; (2) the player symbol set; (3) the player selected automatic award range; (4) the player-selected wager amount for the play of the draw lottery game; (5) the lottery ticket identification number; and (6) any other suitable information.

In various example embodiments, this data record is created by the lottery terminal and sent by the lottery terminal to the lottery server (such as described below in connection with the lottery server 606 of FIG. 5). It should be appreciated that the lottery ticket data record can be otherwise suitably created in accordance with the present disclosure.

Figure 4:
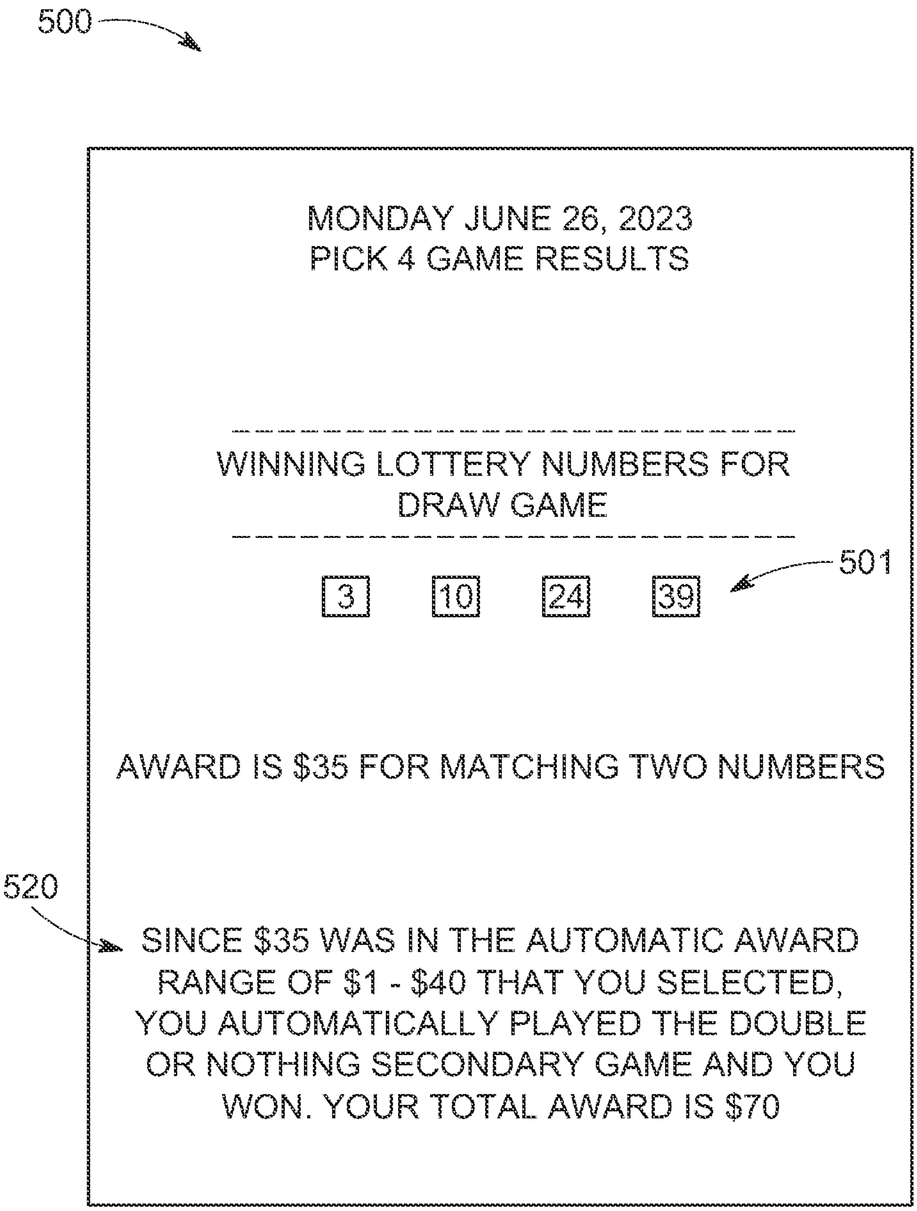
FIG. 4 is a display indicating of a set of drawn lottery numbers for a play of a lottery game and the associated award used for an automatic play of a secondary game that results in a higher award in accordance with one example embodiment of the present disclosure.

FIG. 4 illustrates a display device 500 displaying an example set of winning drawn lottery numbers 501 that are drawn for the play of the draw lottery game. In this example illustrated embodiment, the lottery gaming system randomly selected the numbers 3, 10, 24, and 39 as drawn numbers for the play of the draw lottery game.

In this example embodiment, after the lottery gaming system randomly selects the set of drawn numbers, the lottery gaming system can determine if any purchased lottery tickets are winning lottery tickets.

More specifically, the lottery gaming system compares the set of drawn numbers with player symbol set for the play of the draw lottery game for the example illustrated lottery ticket 400. In this example, the lottery gaming system determines that an award of $35 is won for the play of the draw lottery game because the player symbol set has two numbers that match the drawn numbers (i.e., 3 and 24 in this example).

The lottery gaming system also determines if the award of $35 is within the player selected automatic award range for the play of the secondary game, and if so, automatically uses that award as the wager for the play of the secondary game. In this example, the award of $35 is within the player selected automatic award range of $1-$40, so the lottery gaming system automatically uses that award of $35 as the wager for the play of the secondary game for the lottery ticket 400. In this example, the secondary game is a double or nothing game, and the lottery gaming system randomly determines the outcome for the play of the secondary game. In this example, the randomly determined outcome of the play of the secondary game is positive, and the lottery gaming system determines to double the $35 amount to a $70 award for the play of the secondary game. The lottery gaming system enables the player to redeem the lottery ticket for the $70 award for the play of the secondary game, as indicated in FIG. 4. When this lottery ticket 400 is redeemed, the lottery gaming system causes the award of $70 to be provided to the holder of the lottery ticket 400. In this example, if the award for the play of the game is more than $40 (which is the upper range for using the award for the automatic play of the secondary game), the lottery gaming system does not automatically provide the play of the secondary game and also does not provide the player the opportunity for the play of the secondary game. This limits the potential loss of a relatively larger award for the player.

2nd Example Embodiment

In another example embodiment of the present disclosure, the player selects the $1-$40 range for the player selected automatic award range for the automatic play of the secondary lottery game and if the award is higher than the $40 top of that range (such as an award of $50 in this example), when the player redeems that lottery ticket, the lottery gaming system enables the player to determine if they want to play the secondary game (i.e., the non-automatic play of the secondary game). If the player indicates that the player does not want to play the secondary game, the lottery system provides the player with the award (of $50 in this example). If the player indicates that the player wants to play the secondary game, the lottery system uses the award (of $50 in this example) as the wager for the play of the secondary game. In this example, the secondary game is a double or nothing game, and the lottery gaming system randomly determines the outcome for the play of the secondary game. In this example, the randomly determined outcome of the play of the secondary game is positive, and the lottery gaming system determines to double the $50 wager amount to $100. The lottery gaming system thus enables the player to redeem the lottery ticket for the $100 award for the play of the secondary game. Thus, in this example, if the award for the play of the draw lottery game is more than the $40 top the range for the player selected automatic award range, the lottery gaming system does not automatically provide the play of the secondary game, but rather provides the player the opportunity for the play of the secondary game.

3rd Example Embodiment

In another example embodiment of the present disclosure, the player selects the $1-$20 range for the player selected automatic award range for the automatic play of the secondary lottery game, and if the award is higher than the $20 top of that range (such as an award of $70 in this example) but lower than a secondary wager limit (such as $100 in this example), when the player redeems that lottery ticket, the lottery gaming system enables the player to determine if they want to play the secondary game (i.e., the non-automatic play of the secondary game). If the player indicates that the player does not want to play the secondary game, the lottery system provides the player with the award from the play of the draw lottery game (of $70 in this example). If the player indicates that the player wants to play the secondary game, the lottery system uses the award (of $70 in this example) as the wager for the play of the secondary game. In this example, the secondary game is a double or nothing game, and the lottery gaming system randomly determines the outcome for the play of the secondary game. In this example, the randomly determined outcome of the play of the secondary game is positive, and the lottery gaming system determines to double the $70 amount to $140. The lottery gaming system enables the player to redeem the lottery ticket for the $140 award for the play of the secondary game. In this example, if the award for the play of the draw lottery game is $100 or more, the lottery gaming system does not automatically provide the play of the secondary game and also does not provide the player the opportunity for the play of the secondary game. Rather, the lottery gaming system only allows the redemption of the lottery ticket for the award from the play of the draw lottery game that is greater than $100. This limits the potential loss of a relatively larger award for the player.

4th Example Embodiment

In another example embodiment of the present disclosure, the lottery system is configured such that: (a) the automatic award range for the automatic play of the secondary lottery game is set at any award greater than zero and less than $5; (b) the lottery system gives the player the option to play the secondary game if the award is greater than $5 and less than or equal to $50; (c) the lottery system provides the player the award for any award greater than $50 without providing the play of the secondary game. In various such example embodiments, these amounts are all preset in the lottery gaming system. In various other example embodiments, the lottery gaming system enables the player to select one or more of these amounts for their player specific rules (such as in an online lottery system player account).

5th Example Embodiment

In another example embodiment of the present disclosure, the lottery system is configured such that higher automatic award amounts provide greater odds of winning the secondary game. For example, the lottery gaming system can be structured as follows: (1) a $1-$4 award from play of lottery game has a 1 in 3.8 chance of resulting in a winning outcome (such as doubling); (2) a $5-$9 award from play of lottery game has a 1 in 3.5 chance of resulting in a winning outcome (such as doubling); (3) a $10-$14 award from play of lottery game has a 1 in 3.3 chance of resulting in a winning outcome (such as doubling); (4) a $15-$24 award from play of lottery game has a 1 in 3 chance of resulting in a winning outcome (such as doubling); (5) a $25-$49 award from play of lottery game has a 1 in 2.75 chance of resulting in a winning outcome (such as doubling); and (6) an award of $50 or more from play of lottery game has a 1 in 2.5 chance of resulting in a winning outcome (such as doubling). This example shows that the different odds of winning can be non-linear. Alternatively, the different odds can be linear. It should also be appreciated that the quantity of different odds can vary, and can vary in part based on the automatic award amounts.

It should be appreciated from the above, that the present disclosure improves lottery gaming technology and current lottery tickets in part by providing a new way for players to interact with the lottery gaming system, and new ways to win awards that are based on the automatically played secondary games. It should further be appreciated from the above that the present disclosure improves lottery gaming technology in part by providing a new way to link a draw lottery game with an automatic secondary game through the lottery gaming system. It should further be appreciated from the above that the present disclosure improves lottery gaming technology in part by providing a new type of selection for a player to make for a lottery ticket, and thus also a way to increase lottery ticket sales. It should further be appreciated from the above that the present disclosure improves lottery gaming technology in part by providing new ways to provide different types of awards for lottery tickets, and thus also a way to increase lottery ticket sales.

Example Lottery Gaming Systems—General

As mentioned above, in various embodiments, the lottery gaming system and method of the present disclosure are configured to be operated by a lottery agency (such as a state lottery agency).

As mentioned above, in various other embodiments, the lottery gaming system and method of the present disclosure are configured to be operated by a third party that runs the lottery for a lottery agency (such as a state lottery agency).

Figure 5:
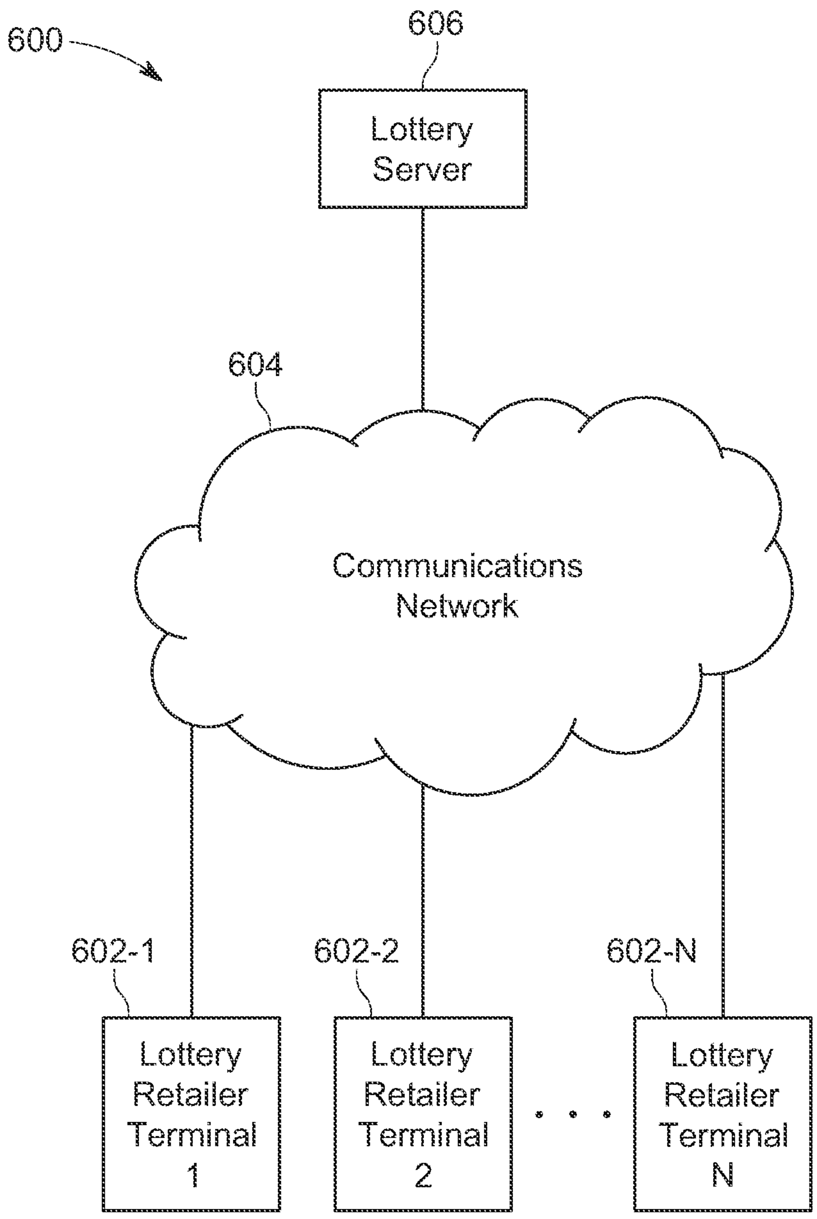
FIG. 5 is a schematic diagram of a lottery gaming system in accordance with one example embodiment of the present disclosure.

FIG. 5 illustrates an example networked lottery gaming system 600 for such implementation. This example network lottery gaming system 600 generally includes: (1) a plurality of lottery retailer terminals 602-1 to 602-N; (2) a communications network 604; and (3) one or more lottery servers such as lottery server 606. Generally, the retailer terminals 602-1 to 602-N and the lottery server 606 are configured to perform the functions described above and further described below.

In this example embodiment, each retailer terminal 602 corresponds to (or is associated with) a particular lottery retailer. For example, the first retailer terminal 602-1 of FIG. 5 may be associated with a first lottery retailer, such as a convenience store, and the second retailer terminal 602-2 of FIG. 5 may be associated with a second lottery retailer, such as a supermarket. It should be understood that any suitable quantity of lottery retailer terminals may be employed in the lottery gaming system 600, along with any suitable quantity of corresponding lottery servers 606.

In various example embodiments, the lottery retailer terminal 602 includes one or more processor(s). Generally, the processor is operative to perform or process instructions, and in particular, to operate in accordance with the various methods described herein. For example, the processor of the lottery retailer terminal 602 may be operable to enable the lottery retailer terminal 602 to transmit data to (and receive data from) the lottery server 606. More specifically, the processor may enable the transmission of data representing each lottery ticket.

In various example embodiments, the lottery retailer terminal 602 includes one or more input device(s). The input devices of the lottery retailer terminal 602 may include components such as an optical scanner and/or a barcode scanner, for reading and/or for deriving information associated with a playslip and/or a lottery ticket. For example, a lottery ticket may include registration marks, authenticity data, various codes, micro-printed indicia, one or more sense marks, and/or other lottery indicia that must be read. Examples of additional input devices include, but are not limited to, a keypad, a mouse, an image capturing device (e.g., an optical character recognition (OCR) device), a biometric reader, a portable storage device (e.g., a memory stick), and the like.

In various example embodiments, the input device(s) of the lottery retailer terminal 602 may include a clock. The clock may be employed to detect, derive and/or append time and/or date information for use by the lottery server 606 to: (i) create a data record corresponding to lottery tickets purchased at the lottery retailer terminal 602, (ii) to determine redemption time, round and/or date information associated with lottery tickets, and/or (iii) determine whether a lottery player has redeemed their lottery ticket in a manner that qualifies the player to receive a particular redemption or settlement amount.

In various example embodiments, the lottery retailer terminal 602 includes one or more output device(s). Such output device(s) may include such components as a display for outputting information to a lottery player or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket, audio/video output device(s), and the like.

In various example embodiments, the lottery retailer terminal 602 also includes one or more communications port(s), such as a serial port, a modem or the like. Generally, the communications port of the lottery retailer terminal 602 may be operable to facilitate two-way data communications between (i) the lottery retailer terminal 602, and (ii) the lottery server 606. In accordance with some embodiments, the communications port of the lottery retailer terminal 602 may operate to facilitate the transmission of information between the lottery retailer terminal and a player device such as a personal digital assistant (PDA), cell phone and/or a dedicated (e.g., a proprietary) device.

In various example embodiments, the lottery retailer terminal 602 includes a data storage device such as a hard disk, optical or magnetic media, random access memory (RAM) and/or read-only memory (ROM), or the like memory device. Generally, the data storage device of the lottery retailer terminal 602 stores a software program, the software program enabling a processor of the retailer terminal 602 to perform various functions including some or all of the various steps described herein. For example, in accordance with various embodiments, the lottery retailer terminal 602 may be configured to perform some or all of the functions of the lottery server 606 (and vice versa) such that the lottery server 606 and the lottery retailer terminal 602 may be considered as the same "device."

In various example embodiments, a lottery sales device may be utilized in place of a lottery retailer terminal 602. Such a lottery sales device may be implemented as a lottery server, a controller, a dedicated hardware circuit, an appropriately programmed general-purpose computer, or any other equivalent electronic, mechanical or electro-mechanical device. Thus, in various embodiments, a lottery sales device may include, for example, but is not limited to: (1) a video lottery terminal that may include a touch sensitive screen for use by a player; (2) a personal computer (e.g., which communicates with a remote lottery server); or (3) a personal mobile device such as a mobile telephone, a tablet, or a personal digital assistant. The lottery sales device may include any or all of the devices of the aforementioned systems.

In this example embodiment, the lottery server 606 operates to: (1) receive and/or store data associated with one or more lottery tickets including such data as: (a) ticket identifier(s), and (b) ticket indicia; (2) determine at least a first redemption amount associated with a lottery ticket; (3) receive a redemption request associated with the lottery ticket; (4) determine a time of play associated with the redemption request; and (5) transmit an indication of the appropriate redemption amount to a lottery retailer terminal (e.g., for output or display to a lottery player and/or lottery terminal operator).

In various example embodiments, the lottery server 606 includes one or more processor(s). Such a processor functions to process instructions, and in particular, to operate in accordance with various methods described herein. For example, the processor may operate to enable the lottery server 606 to transmit data to (and receive data from) the lottery retailer terminal 602. More specifically, the processor of the lottery server 606 may enable the transmission of data representing a lottery ticket, as well as information defining one or more payout(s) associated with that lottery ticket to or by a specific one of the lottery retailer terminals 602 shown in the lottery network 600 of FIG. 5. Thus, the lottery server 606 may be implemented as a system controller, a dedicated hardware circuit, an appropriately and particularly programmed general-purpose computer, or any other equivalent electronic, mechanical or electro-mechanical device capable of providing for one or more of the embodiments described herein.

In various example embodiments, the lottery server 606 includes one or more input device(s). Examples of such input devices include a keypad, a mouse, a touch-screen, a random number generator, a microphone, and other digital or analog input devices.

In various example embodiments, the lottery server 606 also includes one or more output device(s). Example of output device(s) of the lottery server 606 include a monitor or other display for outputting information to an operator of the lottery server 606 (e.g., for displaying information such as statistical or sales data, win and loss information and/or payout amounts), a printer for producing a physical record (e.g., a report) of such data, and the like. In addition, the lottery server 606 may include one or more communications ports, such as a serial port, modem or the like, operable to facilitate two-way data communications between (i) the lottery server 606 and (ii) one or more lottery retailer terminals 602.

In various example embodiments, the lottery server 606 includes a data storage device (e.g., a hard disk or hard drive, a media-based (removable) memory, or the like). In certain embodiments, the data storage device of the lottery server 606 stores at least one software program, which includes a program to enable the processor of the lottery server 606 to perform some or all of the various steps and functions of at least one implementation of the methods described in detail herein. In addition, the data storage device of the lottery server 606 may operate to store one or more databases including a lottery ticket database and a lottery ticket redemption status database.

In various example embodiments, the lottery server 606 includes a lottery ticket server device that is located at a lottery ticket printing facility, and may also function to manage the ticket printing process. The lottery server 606 may also function to develop a lottery game matrix (e.g., determining base payouts, win frequencies, and the like) and to match static lottery content with secure paytable (or payout distribution) data. In certain embodiments, a lottery ticket printer device for use in such lottery gaming systems may utilize the game matrix information from the lottery server and may apply it to the secure paytable data.

In certain example embodiments, a retailer terminal (such as the first retailer terminal 602-1) of FIG. 5 is configured to perform some or all of the functions of the lottery server 606. Thus, in certain example embodiments, the lottery server 606 and the retailer terminal (such as the first retailer terminal 602-1) (or another given retailer terminal and server pairing) may be considered as the same "device."

Generally, the communications network 604 of FIG. 5 includes one or more local and/or wide-area network(s) proprietary and/or public network(s) (e.g., the Internet) for facilitating two-way data communications between the retailer terminals 602 and the lottery server 606. The lottery server 606 may communicate with lottery retailer terminals 602 directly or indirectly, via a wired or wireless medium, such as via the Internet, via a local area network (LAN), via a wide area network (WAN), via an Ethernet, via a Token Ring, via a telephone line, via a cable line, via a radio channel, via an optical communications line, via a satellite communications link, or via any other appropriate communications system or combinations thereof. Any number and type of devices may be in communication with the lottery server 606, and communication between the lottery retailer terminals 602 and the lottery server 606 may be direct or indirect. A variety of communications protocols may be part of any such communications system, including, but not limited to: Ethernet (or IEEE 802.3), SAP, ATP, Bluetooth™, and TCP/IP.

It should be understood that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server may not be necessary and/or preferred. For example, in one or more embodiments, methods described herein may be practiced on a stand-alone gaming device and/or a gaming device in communication only with one or more other gaming devices. In such an embodiment, any functions described as performed by the computer may instead be performed by one or more gaming devices.

As used herein, a lottery retailer may include a merchant who sells lottery tickets at a particular location, authenticates winning lottery tickets, redeems authenticated winning lottery tickets, and/or provides awards to players for winning lottery tickets. Examples of various lottery retailers include, but are not limited to, convenience stores, gas stations, supermarkets, and gaming establishments.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The claims are as follows:

1. A method of operating a lottery gaming system comprising a processor and a memory device that stores a plurality of instructions executable by the processor, the method comprising:

determining, via the processor, a player symbol set for a play of a draw lottery game;

determining, via the processor, a player selected automatic award range for an automatic play of a secondary game;

generating, via the processor, a lottery ticket comprising the player symbol set and the player selected automatic award range;

storing data associated with the lottery ticket;

causing, via the processor, the lottery ticket to be provided to a player, the lottery ticket comprising a player symbol set portion comprising an indication of the player symbol set for the play of the draw lottery game and a player selected automatic award range portion comprising an indication of the player selected automatic award range for the automatic play of the secondary game;

for the play of the draw lottery game, determining a quantity of drawn symbols, the quantity of drawn symbols being at least one;

determining an award for the play of the draw lottery game based on the player symbol set and the drawn symbols;

responsive to the award being within the player selected automatic award range, automatically using the award as a wager for the automatic play of the secondary game; and responsive to the award being greater than the player selected automatic award range, causing a display, by a display device, of an indication of the award and not providing the automatic play of the secondary game.

2. The method of claim 1, wherein the player selected automatic award range is selectable from a plurality of different automatic award ranges.

3. The method of claim 1, wherein a top amount of the player selected automatic award range is less than a top award for the play of the draw lottery game.

4. The method of claim 1, wherein the secondary game is a double or nothing secondary game.

5. The method of claim 4, wherein the automatic play of the secondary game is configured to result in either a higher award than the award that is used as the wager for the play of the secondary game or a lower award than the award that is used as the wager for the play of the secondary game.

6. The method of claim 5, which comprises causing an indication of a probability of obtaining the higher award for the play of the secondary game.

7. The method of claim 1, which comprises causing the display, by the display device, of the indication of the award responsive to an indication of a request for redemption of the lottery ticket.

8. The method of claim 1, wherein the display device is one of part of a mobile device or part of a lottery terminal.

9. A method of operating a lottery gaming system comprising a processor and a memory device that stores a plurality of instructions executable by the processor, the method comprising:

determining, via the processor, a player symbol set for a play of a draw lottery game;

determining, via the processor, a player selected automatic award range for an automatic play of a secondary game;

generating, via the processor, a lottery ticket comprising the player symbol set and the player selected automatic award range;

storing data associated with the lottery ticket;

causing, via the processor, the lottery ticket to be provided to a player, the lottery ticket comprising a player symbol set portion comprising an indication of the player symbol set for the play of the draw lottery game and a player selected automatic award range portion comprising an indication of the player selected automatic award range for the automatic play of the secondary game;

for the play of the draw lottery game, determining a quantity of drawn symbols, the quantity of drawn symbols being at least one;

determining an award for the play of the draw lottery game based on the player symbol set and the drawn symbols;

responsive to the award being within the player selected automatic award range, automatically using the award as a wager for the automatic play of the secondary game; and responsive to the award being greater than the player selected automatic award range:

causing a display, by a display device, of an option for a player decision to use the award as a wager for a non-automatic play of the secondary game, responsive to receipt of a decision to use the award as the wager for the non-automatic play of the secondary game, providing the non-automatic play of the secondary game, and responsive to receipt of a decision to not use the award as the wager for the non-automatic play of the secondary game, not providing the non-automatic play of the secondary game.

10. The method of claim 9, wherein the player selected automatic award range is selectable from a plurality of different automatic award ranges.

11. The method of claim 9, wherein a top amount of the player selected automatic award range is less than a top award for the play of the draw lottery game.

12. The method of claim 9, wherein the secondary game is a double or nothing secondary game.

13. The method of claim 9, wherein the display device is one of part of a mobile device or part of a lottery terminal.

14. A method of operating a lottery gaming system comprising a processor and a memory device that stores a plurality of instructions executable by the processor, the method comprising:

determining, via the processor, a player symbol set for a play of a draw lottery game;

determining, via the processor, a player selected automatic award range for an automatic play of a secondary game;

generating, via the processor, a lottery ticket comprising the player symbol set and the player selected automatic award range;

storing data associated with the lottery ticket;

causing, via the processor, the lottery ticket to be provided to a player, the lottery ticket comprising a player symbol set portion comprising an indication of the player symbol set for the play of the draw lottery game and a player selected automatic award range portion comprising an indication of the player selected automatic award range for the automatic play of the secondary game;

for the play of the draw lottery game, determining a quantity of drawn symbols, the quantity of drawn symbols being at least one;

determining an award for the play of the draw lottery game based on the player symbol set and the drawn symbols;

responsive to the award being within the player selected automatic award range, automatically using the award as a wager for the automatic play of the secondary game;

responsive to the award being higher than the player selected automatic award range and the award being equal to or greater than a secondary wager limit, not providing any play of the secondary game, and causing the lottery ticket to be redeemable for the award; and responsive to the award being greater than the player selected automatic award range and less than the secondary wager limit:

causing a display, by a display device, of an option for a player decision to use the award as a wager for a non-automatic play of the secondary game, responsive to receipt of a decision to use the award as the wager for the non-automatic play of the secondary game, providing the non-automatic play of the secondary game, and responsive to receipt of a decision to not use the award as the wager for the non-automatic play of the secondary game, not providing any play of the secondary game.

15. The method of claim 14, wherein the player selected automatic award range is selectable from a plurality of different automatic award ranges.

16. The method of claim 14, wherein a top amount of the player selected automatic award range and the secondary wager limit are both less than a top award for the play of the draw lottery game.

17. The method of claim 14, wherein the secondary game is a double or nothing secondary game.

18. The method of claim 17, wherein the automatic play of the secondary game is configured to result in either a higher award than the award that is used as the wager for the play of the secondary game or a lower award than the award that is used as the wager for the play of the secondary game.

19. The method of claim 18, which comprises causing an indication of a probability of obtaining the higher award for the play of the secondary game.

20. The method of claim 14, wherein the display device is one of part of a mobile device or part of a lottery terminal.

* * * * *